United States Patent
Krasnow (10) Patent No.: US 12,241,864 B1
(45) Date of Patent: Mar. 4, 2025

(54) GAS CHROMATOGRAPH-ION MOBILITY SPECTROMETER SYSTEMS AND METHODS

(71) Applicant: Verily Life Sciences LLC, Dallas, TX (US)

(72) Inventor: Benjamin Krasnow, Redwood City, CA (US)

(73) Assignee: Verily Life Sciences LLC, Dallas, TX (US)

( * ) Notice: Subject to any disclaimer, the term of this patent is extended or adjusted under 35 U.S.C. 154(b) by 230 days.

(21) Appl. No.: 17/852,697

(22) Filed: Jun. 29, 2022

Related U.S. Application Data (60) Provisional application No. 63/216,993, filed on Jun. 30, 2021.

(51) Int. Cl.
*G01N 27/622* (2021.01)
*G01N 30/02* (2006.01)

(52) U.S. Cl.
CPC ..... *G01N 27/622* (2013.01); *G01N 2030/025* (2013.01)

(58) Field of Classification Search
CPC .. G01N 27/622; G01N 27/623; G01N 27/624; G01N 2030/025
See application file for complete search history.

(56) References Cited

U.S. PATENT DOCUMENTS

| | | | | |
|---|---|---|---|---|
| 6,803,567 B2 * | 10/2004 | Leonhardt | .......... | G01N 30/7206 250/288 |
| 7,608,818 B2 * | 10/2009 | Miller | .................... | G01N 30/30 250/281 |
| 7,884,320 B2 * | 2/2011 | Landgraf | ............ | H01J 49/0427 250/269.1 |
| 9,513,266 B2 | 12/2016 | Zhang et al. | | |
| 10,940,428 B2 * | 3/2021 | Davis | ..................... | A61B 5/082 |

(Continued)

FOREIGN PATENT DOCUMENTS

CN 112305112 A * 2/2021 ........... G01N 27/622

OTHER PUBLICATIONS

Kanu et al. "Ion Mobility Spectrometry Setection for Gas Chromatography." ScienceDirect—Journal of Chromatography A, 1177 (2008) pp. 12-27.

(Continued)

*Primary Examiner* — Justin N Olamit
(74) *Attorney, Agent, or Firm* — Haynes and Boone, LLP

(57) ABSTRACT

In one aspect, a gas chromatography-ion mobility spectrometry (GC-IMS) system is disclosed herein. In some embodiments, the GC-IMS system includes a GC column comprising an inlet and an outlet, and a sample delivery system in fluid connection with the inlet of the GC column and configured to provide a sample to the GC column. The GC column is configured to process the sample and produce a processed sample at the outlet. The GC-IMS system may also include an IMS tube. In some embodiments, the IMS tube includes a sample inlet in fluid communication with the outlet of the GC column, a wall that includes an orifice, and an outlet. The sample inlet may be configured to receive a portion of the processed sample. The IMS tube may be configured to analyze a second portion of pressurized gas.

19 Claims, 8 Drawing Sheets

(56) References Cited

U.S. PATENT DOCUMENTS

2019/0204270 A1    7/2019  Zhang et al.
2021/0267477 A1*   9/2021  Leonhardt ............ G01N 33/497

OTHER PUBLICATIONS

Westhoff et al. "Ion Mobility Spectrometry for the Detection of Volatile Organic Compounds in Exhaled Breath of Patients with Lung Cancer: results of a pilot study." Received Mar. 27, 2008; Accepted Nov. 20, 2008; Published Online First Jan. 20, 2009. (5 pgs).

* cited by examiner

GAS CHROMATOGRAPH-ION MOBILITY SPECTROMETER SYSTEMS AND METHODS

CROSS-REFERENCE TO RELATED APPLICATIONS

The present disclosure claims priority to and the benefit of U.S. Provisional Patent Application No. 63/216,993, filed Jun. 30, 2021, the entirety of which is incorporated by reference herein.

TECHNICAL FIELD

The subject matter described herein relates to gas chromatograph-ion mobility spectrometer (GC-IMS) systems and methods of operating those systems.

BACKGROUND

A gas chromatograph (GC) integrated with an ion mobility spectrometer (IMS) has been widely used as an effective tool for analyzing fluid samples in many technical fields. With their sophisticated setup, typical large-scale GC-IMS systems in laboratory settings are designed to provide users with a range of options for analyzing different types of samples. However, such versatility may also present shortcomings such as more complex operational procedures, higher cost of equipment production, and higher cost associated with analyzing individual samples.

Due to advantages such as detection sensitivity and selectivity, GC-IMS systems are particularly attractive as a health sensor for analyzing small quantity of biological samples containing volatile organic compounds (VOCs). As such health sensors become increasingly important in fields such as diagnostic medicine, it is desirable to improve existing GC-IMS systems for purposes of simplification, reduced cost, and miniaturization, so that they may be more widely adopted in analyzing biological samples in a variety of settings.

The information included in this Background section of the specification, including any references cited herein and any description or discussion thereof, is included for technical reference purposes only and is not to be regarded as subject matter by which the scope of the disclosure is to be bound.

SUMMARY

In one aspect, a gas chromatography-ion mobility spectrometry (GC-IMS) system is disclosed herein. In some embodiments, the GC-IMS system includes a GC column comprising an inlet and an outlet, and a sample delivery system in fluid connection with the inlet of the GC column and configured to provide a sample to the GC column, wherein the GC column is configured to process the sample and produce a processed sample at the outlet. The GC-IMS system may include an IMS tube. In some embodiments, the IMS tube includes a sample inlet in fluid communication with the outlet of the GC column, a wall, and an outlet. The sample inlet may be configured to receive a portion of the processed sample, and wherein the wall comprises an orifice. In some embodiments, the GC-IMS system includes a main pump comprising an inlet and an outlet. The inlet of the main pump is in fluid communication with the outlet of the IMS tube, and the main pump is configured to pressurize the gas exiting the IMS tube and produce pressurized gas at the outlet of the main pump. In some embodiments, the GC-IMS system includes a gas delivery system connected to the outlet of the main pump and configured to deliver a first portion of the pressurized gas and the sample into the GC column and a second portion of the pressurized gas into the IMS tube via the orifice. The IMS tube may be configured to analyze the second portion of the pressurized gas.

In another aspect, a system for analyzing a sample is disclosed herein. In some embodiments, the system may include a gas chromatography (GC) system comprising an inlet and an outlet. The GC system may be configured to receive the sample via the inlet and produce a separated sample at the outlet. The system may also include an ion mobility spectrometry (IMS) system enclosed by at least a wall. In some embodiments, the IMS system includes a sample inlet in fluid connection with the outlet of the GC column and configured to receive the separated sample, an orifice configured to receive a drift gas, wherein orifice penetrates a portion of the wall, and an outlet through which the drift gas exits. In some embodiments, the system for analyzing a sample may also include a main pump comprising an inlet and an outlet, wherein the inlet of the main pump is in fluid connection with the outlet of the IMS system. The main pump may be configured to receive the drift gas exiting the IMS tube and produce pressurized gas at the outlet of the main pump. A portion of the pressurized gas may be allowed to drift into the IMS system via the orifice. The IMS system may be configured to analyze the portion of the pressurized gas.

In yet another aspect, a method of delivering gas through a gas chromatography-ion mobility spectrometry (GC-IMS) system is disclosed herein. The method may include providing a sample through a sample delivery system, compressing air through a main pump to a pressure differential P relative to ambient condition, and delivering a first portion of the compressed air with the sample to a GC column and a second portion of the compressed air to an IMS tube through an orifice disposed on a wall of the IMS tube. In some embodiments, a pressure differential across an inlet and an outlet of the GC column and across the orifice and an outlet of the IMS tube are maintained at P, and a flow rate of the second portion of the compressed air in the IMS tube is adjusted based on P and a diameter of the orifice.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the ocular pharmaceutical applicator, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

In accordance with at least one embodiment of the present disclosure, an integrated GC-IMS system is provided as a compact, portable, and cost-effective health sensing device for analyzing biological samples such as breath and skin emission. In some embodiments, the integrated GC-IMS system eliminates costly and bulky parts based on a unique configuration and design compared with a laboratory-built GC-IMS system. In some embodiments, methods of implementing the integrated GC-IMS system as a compact sensing device are streamlined for analyzing air-based biological samples. Accordingly, the present embodiments provide at least the benefit of reducing complexity and cost associated with operating an integrated GC-IMS for purposes of analyzing biological samples, thereby offering versatility in a variety of health-related sensing applications.

In the present embodiments, the integrated GC-IMS system uses a gas delivery system to provide air as both carrier gas for the GC system and drift gas for the IMS system. In further embodiments, the gas delivery system does not include any flow rate controllers (alternatively referred to as mass flow controllers) that are typically employed to adjust the flow of the carrier gas and the drift gas. Instead, both the carrier gas and the drift gas are regulated by adjusting the pressure of compressed air, which is a known gas with easy-to-measure characteristics, provided by a main gas pump for the entire gas delivery system, and the flow rate of each of the carrier gas and the drift gas is regulated without the need for any individual flow rate or pressure controllers. Accordingly, in contrast to existing GC-IMS systems, there is reduced need for flow rate and/or pressure controllers configured to regulate gas supply according to embodiments of the present disclosure. In the present embodiments, the flow rate of the carrier gas in the GC system and the flow rate of the drift gas in the IMS system are controlled independently using modified structural schemes rather than multiway valves typically found in existing GC-IMS systems. In some embodiments, the flow rate of the drift gas in the IMS system is controlled by an orifice, or aperture, with a pre-determined diameter configured for a desired flow rate for analyzing the GS-separated sample. Accordingly, the structural components of the integrated GC-IMS system, including those of the gas delivery system integrated thereto, can be simplified and the overall system be miniaturized, thereby expanding the current market for such devices and potentially opening new markets for those devices.

The following description is provided for exemplary purposes only and should not be considered to limit the scope of the ocular pharmaceutical applicator. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. The examples described herein are provided for purposes of illustration and thus not intended to be limiting.

Figure 1:
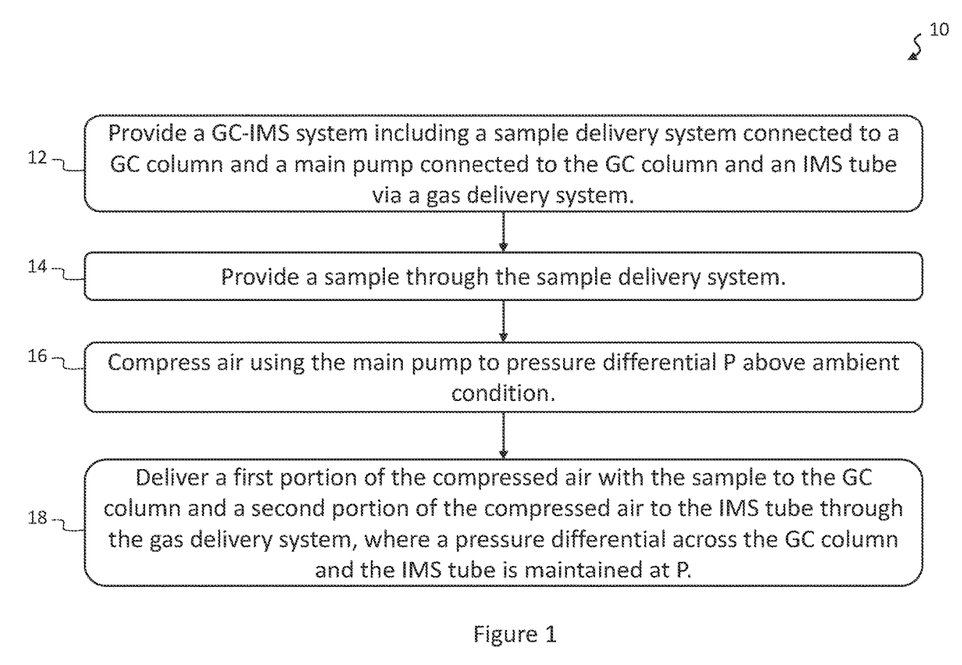
FIG. 1 is a flowchart showing a method of using an exemplary GC-IMS system as depicted in one or more of FIGS. 2, 3, 4, and 5A-6C according to some embodiments of the present disclosure.

FIG. 1 depicts a flowchart showing a method 10 of using a GC-IMS system 100 according to various embodiments of the present disclosure discussed in detail below. Method 10 is merely an example and is not intended to limit the present disclosure beyond what is explicitly recited in the claims. Additional operations can be provided before, during, and after method 10, and some operations described can be replaced, eliminated, or moved around for additional embodiments of the method. In the present disclosure, method 10 is discussed in conjunction with FIGS. 2-7.

Figure 2:
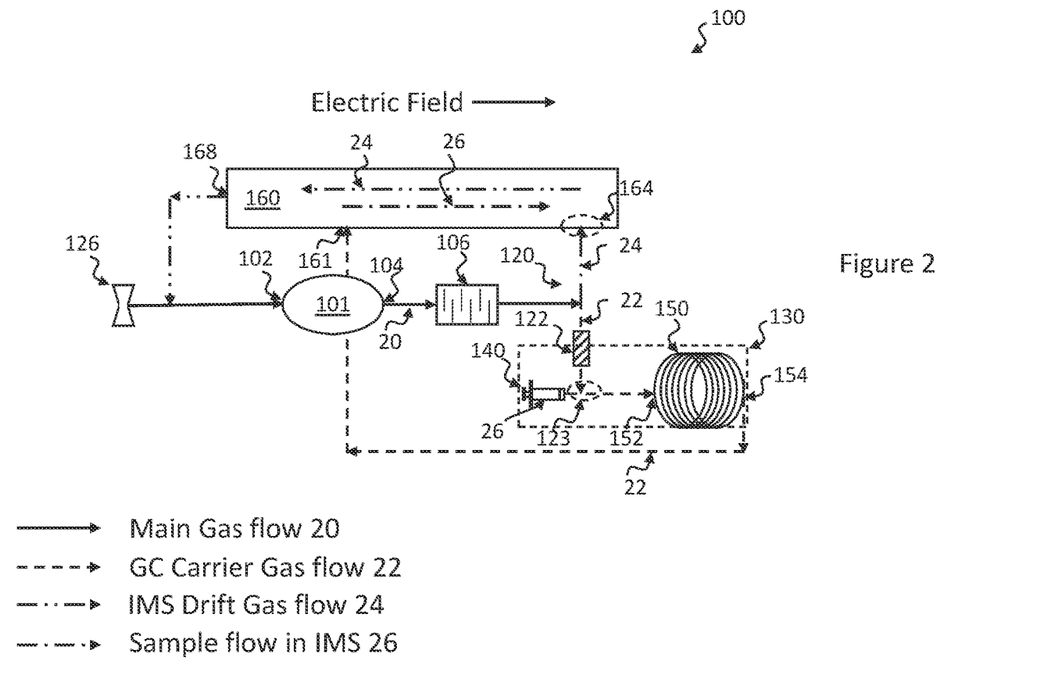
FIG. 2 is a diagrammatic representation of an exemplary GC-IMS system and gas flow pathways within the exemplary GC-IMS system according to some embodiments of the present disclosure.

At operation 12, method 10 provides the GC-IMS system 100 that includes at least a GC system 130 configured to introduce and separate a sample 26, an IMS system (alternatively referred to as the IMS tube) 160 in fluid connection (or fluid communication) with the GC system 130 and configured to analyze the separated sample 26, and a main gas pump 101 configured to compress and circulate gas through a gas delivery system 120 to the GC system 130 and the IMS system 160, respectively. The IMS system 160 and GC system 130 may be coupled using a connecting mechanism configured to allow passage of a fluid (e.g., gas, liquid, etc.) between two terminals that includes one or more intermediate connecting components. In some examples, the intermediate connecting component may be a segment of tubing, a valve (e.g., a pressure controller or flow rate controller), other suitable components, or combinations thereof. In the present embodiments, the main gas pup 101 is configured to circulate air through the gas delivery system 120. Details of the GC-IMS system 100 are depicted in FIG. 2, which is a diagrammatical representation of the GC-IMS system 100 showing various gas flow pathways, and FIG. 3, which is a diagrammatical representation of the GC-IMS system 100 showing an exemplary configuration of the components thereof.

In the present embodiments, the main gas pump 101 is designed to compress and regulate gas that is subsequently provided to both the GC system 130 and the IMS system 160 along various pathways. Importantly, a pressure differential P between the compressed gas produced by the main gas pump 101 and the gas pressure at ambient condition (e.g., room temperature and/or atmospheric pressure) is consistent with the pressure differential across each of the GC system 130 and the IMS system 160 and is thus responsible, at least in part, for creating the flow rate of the carrier gas and the drift gas, respectively.

As discussed above, the embodiments of the present disclosure provide the advantage of a simplified GC-IMS system that does not include any flow rate controllers or pressure controllers typically used in existing GC-IMS systems. In some embodiments, gas at an inlet 102 of the main gas pump 101 is maintained at ambient condition and subsequently compressed by the main gas pump 101 to produce a main gas flow 20 at the desired pressure differential P relative to the ambient condition. In this regard, air compressed (or pressurized) by the main gas pump 101 may be regulated based on easy-to-measure conditions (e.g., ambient temperature and pressure) of air without using any pressure controller or flow rate controller (e.g., manual control valves), which may then be used to calculate flow rate of the main gas flow 20. In the present embodiments, the main gas flow 20 is provided as both the carrier gas (i.e., GC carrier gas flow 22) in the GC system 130 and the drift gas (i.e., IMS drift gas flow 24) in the IMS system 160. In some embodiments, the main gas pump 101 is driven by a proportional-integral-derivative (PID) controller (i.e., a programmable feedback loop) at a variable speed, which in turns regulates and maintains the main gas pump 101 at a desirable pressure output. In other words, with the knowledge of the conditions of the air in its surrounding environment, regulating the pressure of the air is achieved by varying the operational speed of the main gas pump 101 rather than directly adjusting the pressure. In further embodiments, the main gas pump 101 and the PID controller are also connected to a temperature sensor for providing compensation on air density.

Figure 3:
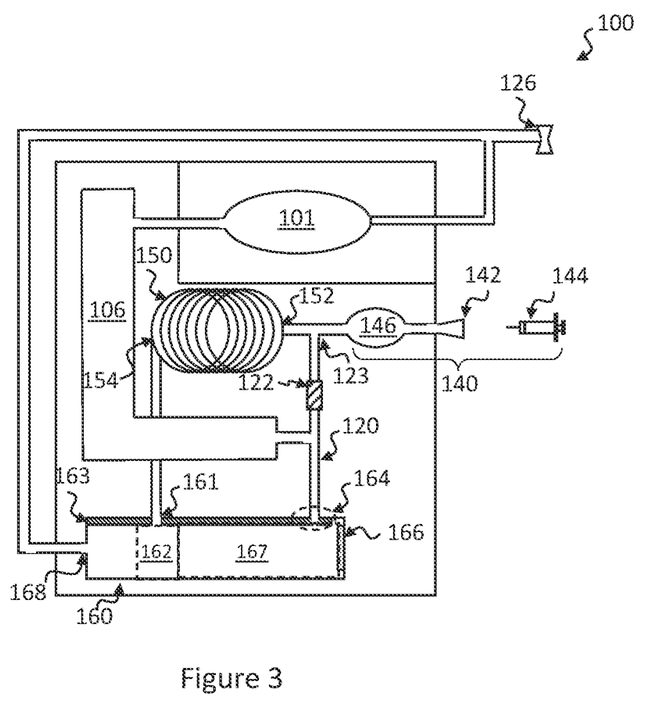
FIG. 3 is a diagrammatic representation of an exemplary GC-IMS system according to some embodiments of the present disclosure.

In the present embodiments, the GC-IMS system 100 further includes a sample delivery system 140 in fluid connection with a GC column 150, which together form the GC system 130. Referring to FIGS. 2 and 3, the sample delivery system 140 includes a sample inlet 142 in fluid communication or direct communication with a sample pump 146, which is configured to draw the sample 26 into the GC system 130 with the application of negative pressure. In some embodiments, the sample 26 is introduced through the sample inlet 142 with a sample collection device such as, for example, an injector 144 or a breathing tube 148 (depicted in FIG. 6A). In this regard, the sample pump 146 is omitted and a segment of inert tubing (comprising polytetrafluoroethylene, or PTFE, or comprising perfluoroalkoxy alkanes, or PFA; not depicted) is included between the gas manifold 123 and the GC column 150. The volume of the inert tubing is consistent with a specified sample volume of the GC column 150 (e.g., 1 milliliter (ml)). The inert tubing is configured to allow the sample 26 to be introduced quickly by a user (e.g., via the injector 144) to fill the inert tubing, and the GC carrier gas flow 22 subsequently pushes the sample 26 into the GC column 150 at the prescribed flow rate. Without the inert tubing, the sample 26 may enter the GC column 150 too quickly for effective separation. In some embodiments, an input check valve (depicted as 720 in FIG. 7) is included between the sample inlet 142 and the GC column 150 (e.g., as a part of a gas manifold 123 discussed in detail below) to prevent the GC carrier gas flow 22 from escaping out of the sample inlet 142. Details of the operation of the sample delivery system 140 is discussed below.

Figure 7:
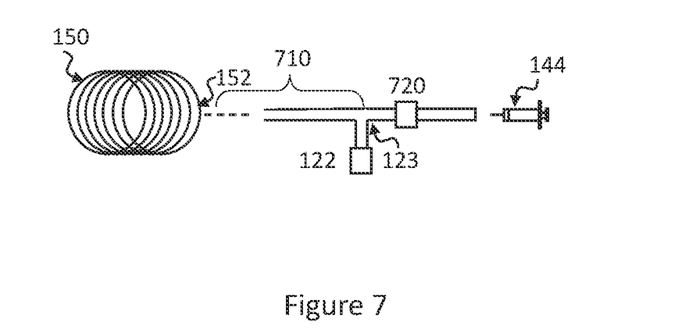
FIG. 7 is a diagrammatic representation of an input portion of an exemplary GC-IMS system according to some embodiments of the present disclosure.

In some embodiments, the inert tubing may be 1.5 mm in diameter and have a sample volume of 3 ml. FIG. 7 illustrates an input portion of an exemplary GC-IMS system, such as system 100, according to some embodiments. Instead of filling a sample loop of controlled volume, the injected sample may always a certain volume, e.g. 3 ml. In normal operation, the carrier gas flow rate may be approximately 5 standard cubic centimeters per minute (sccm/min). When a sample is injected (such as manually by a syringe or an injector, such as injector 144), the pressure in the syringe or injector overcomes the typical system pressure (e.g. of just 3 pounds per square inch (psi)), and the associated input check valve 720 opens, allowing the sample to flow into the inert tubing 710. The second check valve 122 prevents the sample from being injected back into the source of carrier gas. The tubing 710 may be filled as quickly as the user injects the sample. Once sample injection has ended, the whole tube 710 is filled with the sample (its volume being equal to the required sample volume size), the carrier gas will then start loading the sample into the column at a baseline flow rate, such as 5 sccm/min. The separation in the GC column 150 then occurs as usual. Thus, the tubing 710 provides a buffer to be filled with sample, then loaded into the GC column 150 in a controlled manner. During the injection, the speed of gas through the GC column 150 may be very high, and the detector at the end of the column may show an unusual reading. This spurious signal may be ignored since it is just plain carrier gas, and does not affect later processing of the sample gas. The input check valve 720 is normally closed to prevent the drift gas from leaving the system. The GC column 150 may be connected to other parts of a system 100 as shown in FIGS. 2 and 3. In the example of 3 ml sample volume, tubing 710 with an inner diameter of 1.5 mm and a length of 175 cm may be used to provide for the 3 ml of space. If the system is chosen to work with, for example, 1.5 ml samples, the tubing should be sized at half the length. In some embodiments, PFA is chosen for its chemical inertness, high temperature stability for cleaning (bake-out), and relatively low cost.

In the present embodiments, the GC column 150 generally includes components suitable for separating chemicals in the sample 26. For example, the GC column 150 includes a stationary phase (not depicted) configured to interact with the sample 26 carried by a mobile phase, i.e., the GC carrier gas flow 22 discussed in detail below, and based on the distinct retention time of each chemical's interaction with the stationary phase, the sample 26 is separated and subsequently analyzed in the IMS system 160. In some embodiments, the GC column 150 is a capillary column. In some embodiments, the GC system 130 further includes a heater (not depicted) to promote separation of the sample 26 through the GC column 150. The GC system 130 may include other suitable components that facilitate the separation of the sample 26.

Generally, factors such as flow rate of the carrier gas (i.e., the mobile phase) and temperature within the GC column may influence the rate of separation in a GC system. In many existing GC systems, the flow rate or the pressure of the carrier gas is regulated based on changes in the carrier gases' density and viscosity, as well as resistance and dimension (e.g., length) of the GC column. For at least this reason, a flow rate controller and/or a pressure controller are implemented at an inlet of the GC column to accommodate regulation of the carrier gas. While this practice may be advantageous when a variety of carrier gases are implemented for different analytical purposes, it inevitably introduces complexity to the overall setup and operation of the GC system.

In the present embodiments, however, entrance of the GC carrier gas flow 22 at an inlet 152 of the GC column 150 does not include any flow rate controller or pressure controller. Instead, the rate at which the GC carrier gas flow 22 passes through the GC column 150 (i.e., the flow rate of the carrier gas) is regulated by the pressure of the GC carrier gas flow 22 at the inlet 152 and characteristics of the GC column 150 such as, for example, resistance of the stationary phase and the length of the GC column 150. In addition, for embodiments in which the GC system 130 is dedicated to analyzing only air-based samples in ambient conditions, the same GC column 150 can be used to separate different samples without needing to adjust the GC column's resistance and/or length, thereby further simplifying the operation of the GC-IMS system 100.

Still referring to FIGS. 2 and 3, the GC-IMS system 100 further includes the IMS system 160 with a sample inlet 161 in fluid connection with an outlet 154 of the GC column 150. In the present embodiments, the IMS system 160 is configured to receive the (GC-separated) sample 26 with the GC carrier gas flow 22 through the sample inlet 161, ionize the sample 26 in an ionization region 162, separate the ionized sample 26 as it travels through a drift region 167 against the IMS drift gas flow 24, and analyze the separated sample 26 using a detector 166 (e.g., a Faraday plate). The ionization region 162 may be located near or around the sample inlet 161, which is generally opposite the detector 166, and includes an ionization source (not depicted) to charge the sample 26. Because different ions travel with different mobilities against the IMS drift gas flow 24, the sample 26 is effectively separated as the different ions reach and are subsequently analyzed by the detector 166. An electronic shutter may be disposed between the ionization region 162 and the drift region 167 to accommodate the separation of the ionized sample 26. As depicted herein, interior space of the IMS system 160 is defined by an enclosure that includes a wall 163 extending along a traveling direction of the ionized sample 26 except at those portions of the wall 163 where the sample inlet 161, an orifice 164, and an outlet 168 (discussed in detail below) are disposed, which expose the interior space to the exterior environment. In addition, referring to FIGS. 2 and 3 and further to FIG. 4, which depicts a diagrammatical planar top view of a portion of the IMS system 160, an electric field is formed across the interior space of the IMS system 160 by multiple electrodes 165 disposed along the wall 163 of the IMS system 160. In some embodiments, as shown in FIG. 6C, the wall 163 includes a printed circuit board (PCB) having the electrodes 165 and a region 169 printed thereon, where the region 169 includes various circuit components (e.g., an analog amplifier and an analog-digital converter) and connections. In some embodiments, the detector 166 is disposed in the region 169. In some embodiments, the wall 163 extends beyond the enclosure of the IMS system 160. The IMS system 160 may include other suitable components that facilitate the analysis of the sample 26.

Figure 4:
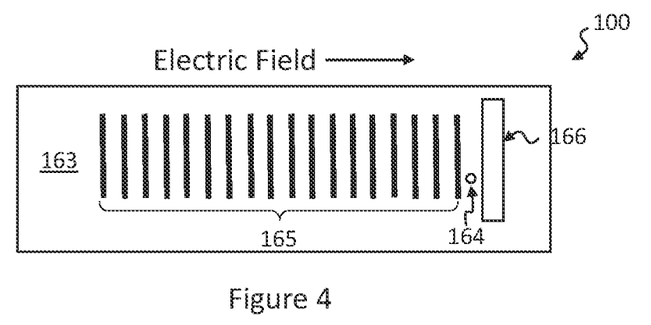
FIG. 4 is a diagrammatic planar top view of a portion of an exemplary GC-IMS system according to some embodiments of the present disclosure.
Figure 5A:
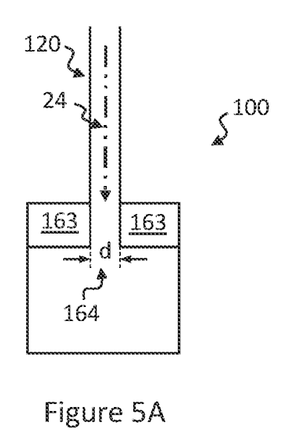
FIG. 5A is a diagrammatic cross-sectional side view of a portion of an exemplary GC-IMS system according to some embodiments of the present disclosure.
Figure 5B:
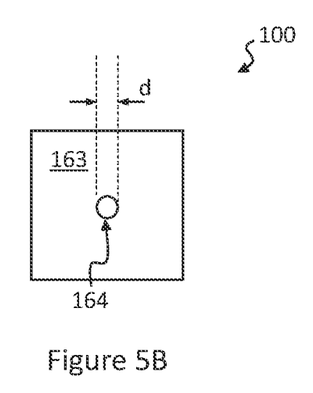
FIG. 5B is a diagrammatic planar top view of a portion of an exemplary GC-IMS system according to some embodiments of the present disclosure.

As depicted in FIGS. 2-4, the gas delivery system 120 directly connects with the IMS system 160 through the orifice 164 to deliver the IMS drift gas flow 24, which subsequently leaves the IMS system 160 through an outlet 168. Now referring to FIGS. 5A and 5B, which are diagrammatical cross-sectional view and planar top view of a portion of the IMS system 160, respectively, the gas delivery system 120 directly delivers the IMS drift gas flow 24 to the interior space of the IMS system 160 through the orifice 164, which penetrates the wall 163 and is defined by a diameter d. In other words, the junction at which the IMS drift gas flow 24 enters the IMS system 160 does not include any valve for controlling the pressure or the flow rate of the drift gas. Accordingly, the rate at which the IMS drift gas flow 24 passes through the IMS system 160 is determined by the pressure of the IMS drift gas flow 24 at the orifice 164 and the diameter d. In some embodiments, as depicted herein, the orifice 164 is disposed between the electrodes 165 and the region 169 on the PCB. In some embodiments, the orifice 164 is disposed elsewhere in the IMS system 160, such as in a metal or plastic housing of the PCB. In this regard, the orifice 164 is in fluid connection with another opening (not depicted) through the PCB to introduce the IMS drift gas flow 24 into the IMS system 160. It is noted that regardless of the location of the orifice 164, the flow rate of the IMS drift gas flow 24 is controlled by the orifice 164.

In further embodiments, referring to FIG. 2, the main gas pump 101 includes an inlet 102 and an outlet 104. The outlet 168 of the IMS system 160 is in fluid connection with the inlet 102 of the main gas pump 101. In some embodiments, the gas delivery system 120 further includes a valve 126 in fluid connection with both the outlet 168 and the inlet 102 to ensure that the outlet 168 is maintained at ambient condition and to provide gas (e.g., air) through the inlet 102 of the main gas pump 101.

At operation 14, referring to FIGS. 1-3, method 10 proceeds to providing the sample 26 through the sample delivery system 140. The present embodiments provide multiple methods of introducing the sample 26 into the GC-IMS system 100. In some examples, the injector 144 (e.g., a syringe) may directly deliver the sample 26 into the GC carrier gas flow 22, which ultimately enters the GC column 150 as discussed in detail below. In some examples, a subject (e.g., a patient) may breathe directly into the breathing tube 148 to deliver the sample 26 to the GC carrier gas flow 22. In some embodiments, it is sufficient to introduce the sample 26 through the sample delivery system 140 and into the GC column 150 without needing the suctioning power (i.e., negative pressure) provided by the sample pump 146. In some embodiments, the sample pump 146 is used in conjunction with one or both of the injector 144 and the breathing tube 148 to increase the efficiency of the sample introduction process.

Although not intended to be limiting, the sample 26 provided herein may be any suitable air-based biological sample containing one or more VOCs to be analyzed for diagnostic purposes. Examples of the sample 26 include, for example, breath, skin emission, room or ambient air samples, and other suitable samples that can be collected and introduced into the GC column 150 by the sample delivery system 140.

At operation 16, referring to FIGS. 1-3, method 10 proceeds to compressing gas from ambient condition using the main gas pump 101. As discussed above, because the intended samples of the GC-IMS system 100 are generally air-based biological samples, complexity and cost of the main gas pump 101 may be reduced by including components suitable for low-pressure analytical applications. In the present embodiments, the main gas pump 101 compresses air from the ambient condition, such as at atmospheric pressure of about 1 atm or about 14.696 psi, to form the main gas flow 20. In further embodiments, the degree of compression is defined by the pressure differential P, which may be less than about 10 psi. In some embodiments, the pressure differential P is about 2 psi to about 3 psi, i.e., the main gas flow 20 has a pressure of about 2 psi to about 3 psi above the ambient condition. In further embodiments, such low-pressure applications combined with the use of a well-known gas, such as air, eliminates the need for implementing a complex flow sensor. In some embodiments, the pressure sensor may be a micro-electro-mechanical system (MEMS)-based sensor. In one example, the MEMS-based sensor may be suitable for detecting an absolute pressure in a range of about 260 hPa (or about 3.77 psi) to about 1260 hPa (or about 18.27 psi).

At operation 18, still referring to FIGS. 1-3, method 10 proceeds to delivering the main gas flow 20, represented by the solid arrow in FIG. 2, throughout the GC-IMS system 100 via the gas delivery system 120. In some embodiments, before being distributed to the GC system 130 and the IMS system 160, the main gas flow 20 passes through a drying medium 106 (also depicted in FIG. 6B), which removes residual moisture and/or VOCs from the compressed gas. For example, the outlet 104 of main gas pump 101 may be in fluid communication with drying medium 106. The drying medium 106 may include any suitable material such as, for example, molecular sieve, carbon particles, silica gel beads, or a combination thereof. In some embodiments, as depicted in FIG. 6B, the drying medium 106 may be arranged in a winding path filled with molecular sieve and carbon particles mixed therein and/or separated into portions. For example, a first portion of the drying medium 106 near the outlet 104 of the main gas pump 101 substantially includes the molecular sieve and a second portion of the drying medium 106 farther away from the outlet 104 includes carbon particles mixed in the molecular sieve.

Subsequently, referring to FIG. 2, the main gas flow 20 separates into the GC carrier gas flow 22 toward the GC column 150 and the IMS drift gas flow 24 toward the IMS system 160. In the present embodiments, because the GC carrier gas flow 22 is to combine with the sample 26 introduced through the sample delivery system 140, the GC carrier gas flow 22 first passes through a check valve 122 configured to prevent any back-flow of the sample 26 into the clean, dried main gas flow 20 or into the IMS system 160 through the IMS drift gas flow 24. In this regard, the check valve 122 is designed to only guide the GC carrier gas flow 22 in one direction toward the GC column 150.

As indicated by the dashed line, still referring to FIG. 2, the GC carrier gas flow 22 carries the sample 26 into the inlet 152 of the GC column 150 and subsequently exits at the outlet 154. Though not required, the gas manifold 123 (also depicted in FIGS. 3 and 6B) may be provided to facilitate the delivery of the sample 26 to the GC column 150. In this regard, the gas manifold 123 is in fluid connection with both the sample delivery system 140 (e.g., the sample inlet 142 and/or the sample pump 146) and the inlet 152 of the GC column 150. Because the outlet 154 is in fluid connection with a sample inlet 161 of the IMS system 160, which is held at ambient condition (discussed in detail below), the pressure of the GC carrier gas flow 22 drops across the GC column 150 by the pressure differential P between the inlet 152 and the outlet 154. In the present embodiments, given that the pressure differential P is determined by the output of the main gas pump 101 and other factors that influence flow rate of the carrier gas are known and/or easily calculated, a desired rate of the GC carrier gas flow 22 is obtained by adjusting properties of the GC column 150, such as its resistance (e.g., the composition of the stationary phase of the GC column 150) and the dimension (e.g., the length). In one non-limiting example, the rate of the GC carrier gas flow 22 is set at about 5 sccm (standard cubic centimeters per minute) based on a pressure differential P of about 3 psi, a column length of about 15 m, and a column diameter of about 0.5 mm. Of course, other column configurations may also be applicable depending on a given pressure differential P and a desired rate of the GC carrier gas flow 22, both of which may be determined based on considerations commonly known to one ordinarily skilled in art.

Upon exiting the outlet 152 of the GC column 150, the sample 26, now separated by retention time though the GC column 150, flows with the GC carrier gas flow 22 into the sample inlet 161 of the IMS system (alternatively referred to as the IMS tube) 160, in which the separated sample 26 is subsequently ionized and analyzed for its VOC content as it travels against the IMS drift gas flow 24.

In the present embodiments, the IMS drift gas flow 24 enters the IMS system 160 through the orifice 164, which penetrates the wall 163 of the IMS system 160. Because the outlet 168 of the IMS system 160 is held at ambient condition as discussed above, the pressure drop across the IMS drift gas flow 24 is consistent with the pressure differential P. In the present embodiments, the IMS drift gas flow 24 directly enters the interior of the IMS system 160 without passing through a flow rate or pressure controller. In other words, referring to FIG. 5A, the interior of the IMS system 160 is directly exposed to the IMS drift gas flow 24 without any intermediate control schemes. Stated in yet another way, the IMS drift gas flow 24 is delivered directly from the gas delivery system 120 into the interior of the IMS system 160 without passing through any gas or flow control valve. Rather, the rate of the IMS drift gas flow 24 is controlled by the diameter d of the orifice 164. In some embodiments, increasing the diameter d increases the rate of the IMS drift flow 24, and conversely, decreasing the diameter d decreases the rate of the IMS drift flow 24. In the present embodiments, the rate of the IMS drift flow 24 within the IMS system 160 is higher than that of the GC carrier gas flow 22 within the GC column 150. In a non-limiting example, for a pressure differential P of about 3 psi, the rate of the IMS drift flow 24 may be about 300 sccm for a diameter d of about 0.25 mm. Of course, other dimensions of the orifice 164 may also be applicable depending on a given pressure differential P and a desired rate of the IMS drift gas flow 24, which may be determined based on considerations commonly known to one ordinarily skilled in art. Thus, in one embodiment, the rate of the IMS drift flow 24 may be about 300 sccm, and the rate of the GC carrier gas flow 22 may be about 5 sccm.

As discussed above, the IMS drift gas flow 24 exits the IMS system 160 at the outlet 168, which is kept at ambient condition by being in connection with the valve 126 that opens to the surrounding environment, and is subsequently filtered and compressed by the main gas pump 101, thereby completing a cycle of flow through the GC-IMS system 100.

Figure 6A:
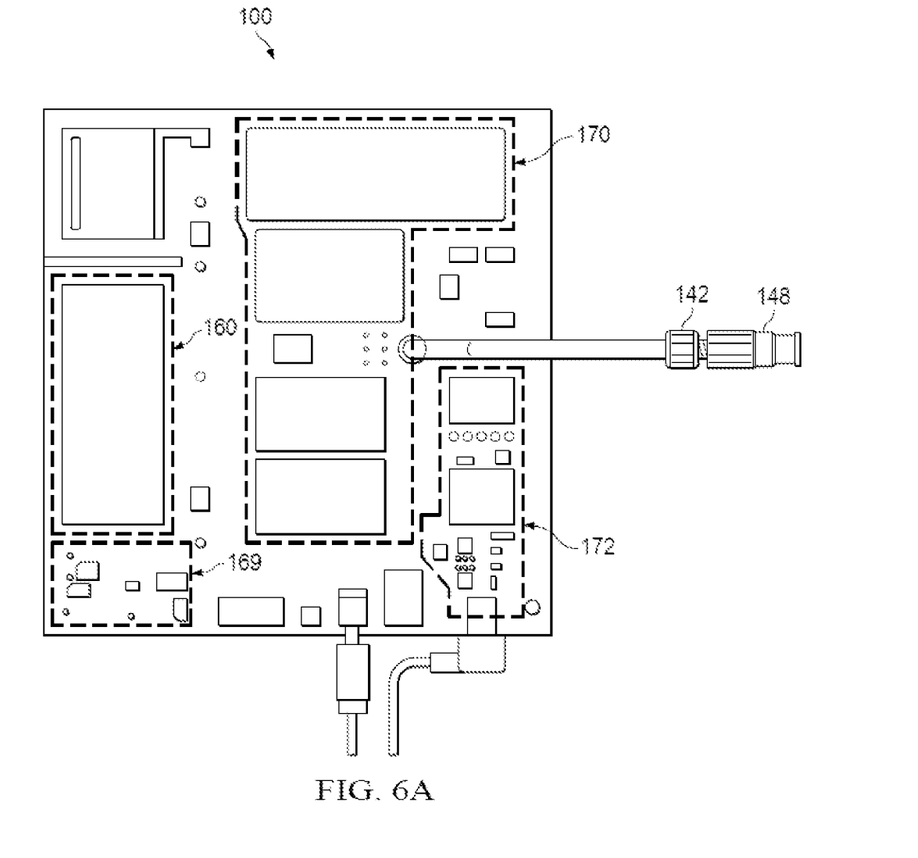
FIG. 6A is a representation of a portion of an exemplary GC-IMS system according to some embodiments of the present disclosure.
Figure 6B:
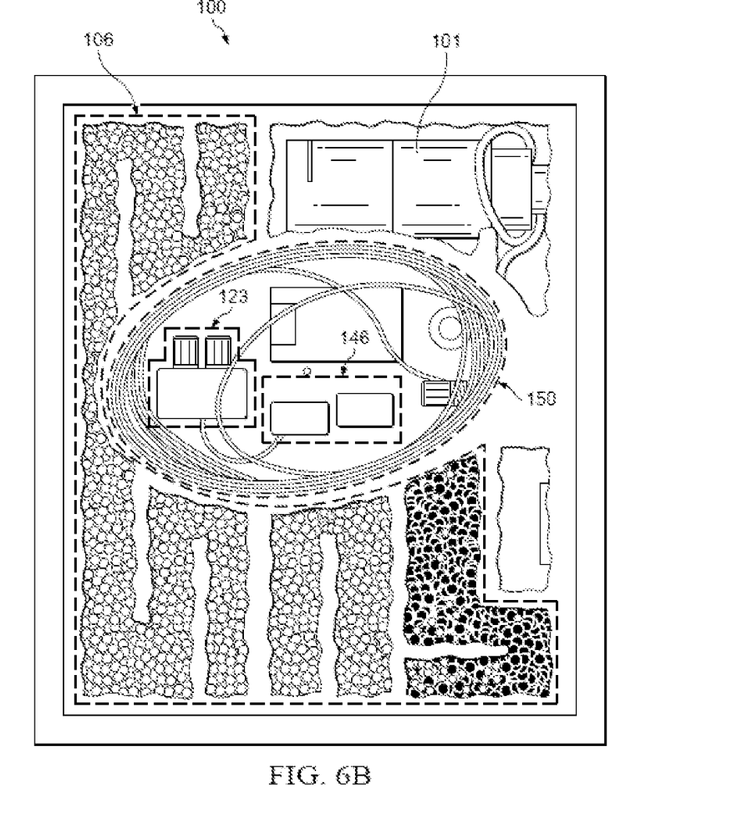
FIG. 6B is a representation of a portion of an exemplary GC-IMS system according to some embodiments of the present disclosure.
Figure 6C:
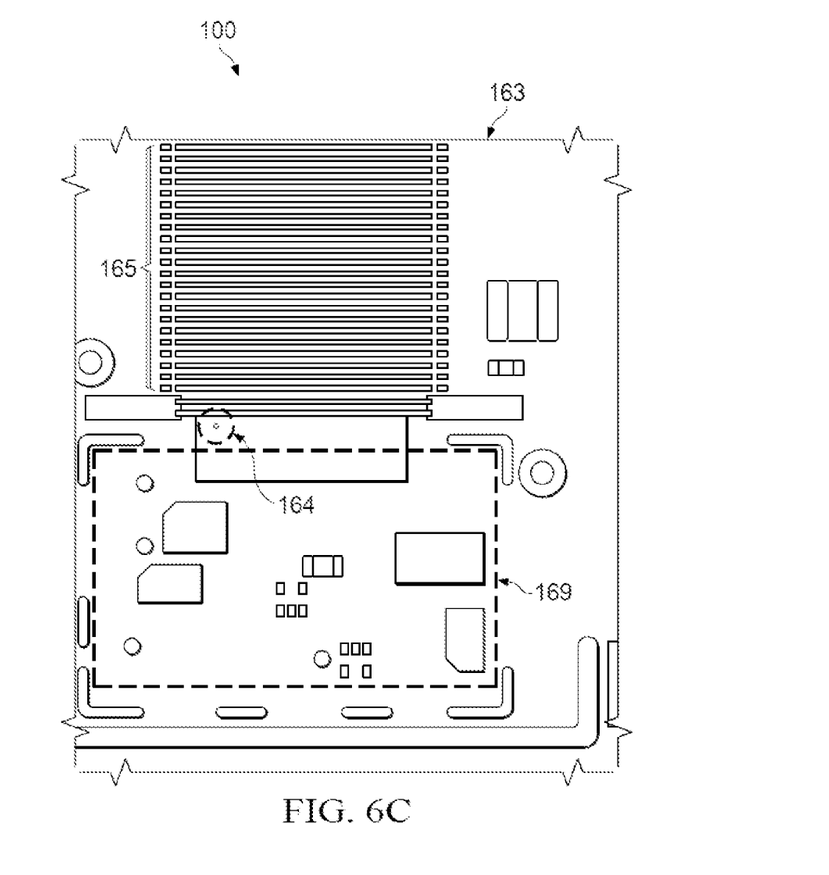
FIG. 6C is a representation of a portion of an exemplary GC-IMS system according to some embodiments of the present disclosure.

Referring to FIGS. 6A-6C, which are representations of various portions of the GC-IMS system 100, other components may be included in the GC-IMS system 100 and the components discussed above may be arranged in configurations to meet various design requirements.

In one example, referring to FIG. 6A, a power supply 170 and a processor 172 may be integrated with the various components discussed above for a more compact GC-IMS system 100. In another example, various components may be strategically arranged, such as in a stacked and/or nested configuration, to reduce footprint of the GC-IMS system 100. In this regard, FIGS. 6A and 6B depict two opposite planar views of the same GC-IMS system 100, such that the sample inlet 142 depicted in FIG. 6A is in fluid connection with the gas manifold 123 depicted FIG. 6B, and the GC column 150 depicted in FIG. 6B is in fluid connection with the IMS system 160 depicted in FIG. 6A. In addition, the gas manifold 123 and the sample pump 146 may be nested within the GC column 150, as depicted in FIG. 6B. In addition, FIG. 6C depicts a portion of the wall 163 of the IMS system 160, including the arrangement of the multiple electrodes 165 with respect to the position of the orifice 164 and the region 169, which are discussed in detail above.

It is noted that the devices and systems described herein may include additional or alternative components, form factors, or sub-assemblies.

In embodiments that include a processor, the processor may comprise any combination of general-purpose computing devices, reduced instruction set computing (RISC) devices, application-specific integrated circuits (ASICs), field programmable gate arrays (FPGAs), or other related logic devices, including mechanical and quantum computers. In some embodiments, the processor comprises a memory in which instructions or information are stored, and the processor operates based on the instructions or information. The memory may be co-located on the same board or chip with processing elements or else located external to a board or chip containing processing elements. The memory may comprise any combination of read-only memory (ROM), programmable read-only memory (PROM), electrically erasable read-only memory (EEPROM), magnetic or electronic random access memory (RAM), flash memory, removable media, or other related memory types.

In embodiments that include external communication, including but not limited to software updates, firmware updates, or readings from the device, communication to and from the device could be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the ocular pharmaceutical applicator. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

Generally, any creation, storage, processing, and/or exchange of user data associated the method, apparatus, and/or system disclosed herein is configured to comply with a variety of privacy settings and security protocols and prevailing data regulations, consistent with treating confidentiality and integrity of user data as an important matter. For example, the apparatus and/or the system may include a module that implements information security controls to comply with a number of standards and/or other agreements. In some embodiments, the module receives a privacy setting selection from the user and implements controls to comply with the selected privacy setting. In other embodiments, the module identifies data that is considered sensitive, encrypts data according to any appropriate and well-known method in the art, replaces sensitive data with codes to pseudonymize the data, and otherwise ensures compliance with selected privacy settings and data security requirements and regulations.

The above specification, examples and data provide a complete description of the structure and use of exemplary embodiments of the ocular pharmaceutical applicator as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, different types of power sources may be used to power electronics, including batteries, solar cells, springs, and external "wall current."

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A gas chromatography-ion mobility spectrometry (GC-IMS) system, comprising:
  a GC column comprising an inlet and an outlet;
  a sample delivery system in fluid connection with the inlet of the GC column and configured to provide a sample to the GC column, wherein the GC column is configured to process the sample and produce a processed sample at the outlet;
  an IMS tube comprising:
    a sample inlet in fluid communication with the outlet of the GC column;
    a wall comprising an orifice; and
    an outlet, wherein the sample inlet is configured to receive a portion of the processed sample;
  a main pump comprising an inlet and an outlet, wherein the inlet of the main pump is in fluid communication with the outlet of the IMS tube, and wherein the main pump is configured to pressurize the gas exiting the IMS tube and produce pressurized gas at the outlet of the main pump; and
  a gas delivery system connected to the outlet of the main pump and configured to deliver a first portion of the pressurized gas and the sample from the outlet of the main pump into the GC column and a second portion of the pressurized gas into the IMS tube via the orifice, wherein the IMS tube is configured to analyze the second portion of the pressurized gas.

2. The GC-IMS system of claim 1, wherein the gas delivery system is configured such that a first pressure differential between the inlet and the outlet of the GC column and a second pressure differential between the orifice and an outlet of the IMS tube are maintained in equilibrium.

3. The GC-IMS system of claim 2, wherein resistance of the GC column is configured to control flow rate of the first portion of the pressurized gas based on the first pressure differential.

4. The GC-IMS system of claim 2, wherein a diameter of the orifice is configured to control flow rate of the second portion of the pressurized gas based on the second pressure differential.

5. The GC-IMS system of claim 1, further comprising a drying medium disposed between an outlet of the main pump and the gas delivery system.

6. The GC-IMS system of claim 1, wherein the sample delivery system includes a sample collection device, a sample pump, or a combination thereof.

7. The GC-IMS system of claim 1, wherein the gas delivery system does not comprise any pressure controller or flow rate controller.

8. The GC-IMS system of claim 1, wherein the gas delivery system includes a one-way check valve disposed between the outlet of the main pump and an inlet of the GC column.

9. The GC-IMS system of claim 1, wherein the gas delivery system is in direct contact with an interior of the IMS tube via the orifice.

10. A system for analyzing a sample, comprising:
a gas chromatography (GC) system comprising an inlet and an outlet, wherein the GC system is configured to receive the sample via the inlet and produce a separated sample at the outlet;
an ion mobility spectrometry (IMS) system enclosed by at least a wall, wherein the IMS system comprises:
a sample inlet in fluid connection with the outlet of the GC system and configured to receive the separated sample;
an orifice configured to receive a drift gas, wherein orifice penetrates a portion of the wall; and
an outlet through which the drift gas exits; and
a main pump comprising an inlet and an outlet, wherein the inlet of the main pump is in fluid connection with the outlet of the IMS system, wherein the main pump is configured to receive the drift gas exiting the IMS system and produce pressurized gas at the outlet of the main pump, wherein a second portion of the pressurized gas is allowed to drift into the IMS system via the orifice, wherein the IMS system is configured to analyze the second portion of the pressurized gas, and wherein a first portion of the pressurized gas and the sample are delivered from the outlet of the main pump to the GC system.

11. The system of claim 10, wherein the wall further comprises a plurality of electrodes configured to produce an electric field within the IMS system and a printed circuit board (PCB), and wherein the orifice is disposed between the plurality of electrodes and a region of the PCB.

12. The system of claim 10, wherein a diameter of the orifice is configured to control a flow rate of the drift gas in the IMS system.

13. The system of claim 10, wherein a fluid connection between the outlet of the main pump and the orifice does not comprise any flow rate controller or pressure controller.

14. The system of claim 10, wherein a fluid connection between the outlet of the main pump and the inlet of the GC system does not comprise any flow rate controller or pressure controller.

15. A method of delivering gas through a gas chromatography-ion mobility spectrometry (GC-IMS) system, comprising:
providing a sample through a sample delivery system;
compressing air through a main pump to a pressure differential P relative to ambient condition; and
delivering a first portion of the compressed air with the sample from an outlet of the main pump to a GC column and a second portion of the compressed air to an IMS tube through an orifice disposed on a wall of the IMS tube, wherein a pressure differential across an inlet and an outlet of the GC column and across the orifice and an outlet of the IMS tube are maintained at P, and wherein a flow rate of the second portion of the compressed air in the IMS tube is adjusted based on P and a diameter of the orifice.

16. The method of delivering gas through the GC-IMS system of claim 15, wherein flow rate of the first portion of the compressed air in the GC column is adjusted based on resistance of the GC column.

17. The method of delivering gas through the GC-IMS system of claim 15, wherein the flow rate of the second portion of the compressed air in the IMS tube is adjusted to be greater than a flow rate of the first portion of the compressed air in the GC column.

18. The method of delivering gas through the GC-IMS system of claim 15, further comprising, before delivering the first portion and the second portion of the compressed air, drying the compressed air with a drying medium.

19. The method of delivering gas through the GC-IMS system of claim 15, wherein providing the sample comprises:
collecting the sample, wherein the sample includes air and at least one volatile organic compound (VOC);
compressing the sample by a sample pump; or
a combination thereof.

* * * * *